(12) United States Patent
Schramm et al.

(10) Patent No.: US 9,477,222 B2
(45) Date of Patent: Oct. 25, 2016

(54) MAINTENANCE INFORMATION DEVICE, CONDITION SENSOR FOR USE THEREIN AND METHOD WHICH CAN BE CARRIED OUT THEREWITH FOR ARRIVING AT A DECISION WHETHER OR NOT TO PERFORM SERVICING OR MAINTENANCE

(75) Inventors: Gerrit Schramm, Uetersen (DE); Arnd Schirrmann, Hamburg (DE); Klaus Zoller, Hamburg (DE)

(73) Assignee: EADS Deutschland GmbH, Ottobrunn (DE)

( * ) Notice: Subject to any disclaimer, the term of this patent is extended or adjusted under 35 U.S.C. 154(b) by 724 days.

(21) Appl. No.: 13/881,773

(22) PCT Filed: Oct. 11, 2011

(86) PCT No.: PCT/EP2011/067717
§ 371 (c)(1),
(2), (4) Date: Jun. 7, 2013

(87) PCT Pub. No.: WO2012/055699
PCT Pub. Date: May 3, 2012

(65) Prior Publication Data
US 2014/0365178 A1    Dec. 11, 2014

(30) Foreign Application Priority Data
Oct. 28, 2010   (DE) .......................... 10 2010 049 909

(51) Int. Cl.
*G05B 23/02*    (2006.01)
(52) U.S. Cl.
CPC ....... *G05B 23/0208* (2013.01); *G05B 23/0283* (2013.01); *G05B 2219/32234* (2013.01)

(58) Field of Classification Search
CPC ................ G05B 2219/32234; G05B 23/0208; G05B 23/0283
USPC ............. 702/34, 179, 184, 194; 73/7, 865.9; 340/870.01; 700/286; 709/224
See application file for complete search history.

(56) References Cited

U.S. PATENT DOCUMENTS 5,533,413 A   7/1996  Kobayashi et al.
6,442,511 B1 * 8/2002  Sarangapani ......... G06F 11/008
                                            340/870.01
(Continued)

FOREIGN PATENT DOCUMENTS

DE    31 10 774 A1   10/1982
DE    101 44 076 A1   3/2003
(Continued)

OTHER PUBLICATIONS

International Atomic Energy Agency, "Implementation Strategies and Tools for Condition Based Maintenance at Nuclear Power Plants", IAEA-TECDOC-1551, May 2007.
(Continued)

*Primary Examiner* — John H Le
(74) *Attorney, Agent, or Firm* — Global IP Counselors, LLP (57) ABSTRACT

A maintenance information device and method for performing condition-based maintenance by monitoring of the condition of a technical system using a sensor. In order to permit the use of relatively simple sensors with relatively simple evaluation logics, the method and device perform decision making processes on the basis of hyperordinal signals from imperfect hyperordinal condition sensors.

20 Claims, 3 Drawing Sheets

(56) References Cited

U.S. PATENT DOCUMENTS

| | | | |
|---|---|---|---|
| 8,712,726 B2 * | 4/2014 | Li | G05B 23/0283 702/179 |
| 2003/0065771 A1 | 4/2003 | Cramer et al. | |
| 2003/0173736 A1 | 9/2003 | Yano | |
| 2006/0155511 A1 | 7/2006 | Steinmueller et al. | |

FOREIGN PATENT DOCUMENTS

| | | |
|---|---|---|
| DE | 101 48 214 C2 | 7/2003 |
| DE | 102 22 187 A1 | 12/2003 |
| DE | 102 39 610 B3 | 6/2004 |
| DE | 103 32 629 A1 | 2/2005 |
| DE | 10 2005 012 901 B4 | 3/2008 |
| DE | 10 2007 029248 A1 | 1/2009 |
| EP | 1 298 005 A2 | 4/2003 |
| EP | 1 431 927 A1 | 6/2004 |
| EP | 08 95 197 B1 | 1/2006 |

OTHER PUBLICATIONS

Memorandum for Secretaries of the Military Departments, "SUBJECT: Condition Based Maintenance Plus" Policy for Department of Defence Conditioned-Based Maintenance Plus, Deputy Under Secretary of Defence for Logistics and Materiel Readiness, Nov. 25, 2002.

International Search Report of corresponding International Application No. PCT/EP2011/067717, dated on Mar. 16, 2012.

German Office Action of corresponding German Patent Application No. 10 2010 049 090.9, dated on Jun. 30, 2011.

Don Jarrell et al., "Prognostics and Condition Based Maintenance (CBM) A Scientific Crystal Ball", Pacific Northwest National Laboratory, Richland, Washington, No. PNNL-SA-36771, dated 2002.

\* cited by examiner

FIG 1

MAINTENANCE INFORMATION DEVICE, CONDITION SENSOR FOR USE THEREIN AND METHOD WHICH CAN BE CARRIED OUT THEREWITH FOR ARRIVING AT A DECISION WHETHER OR NOT TO PERFORM SERVICING OR MAINTENANCE

CROSS-REFERENCE TO RELATED APPLICATIONS

This U.S. National stage application claims priority under 35 U.S.C. §119(a) to German Patent Application No. 10 2010 049 909.9, filed on Oct. 28, 2010, the entire contents of German Patent Application No. 10 2010 049 909.9 are hereby incorporated herein by reference.

BACKGROUND

1. Field of the Invention

The invention relates to a device and a method for assisting a decision whether or not servicing or maintenance of a system whose condition is monitored by means of a condition sensor is to be carried out. Furthermore, the invention relates to a condition sensor which can be used in such a device or in such a method.

2. Background Information

The invention is in the field of condition-based maintenance (CBM). In brief, CBM means that servicing or maintenance is carried out when there is a need for it. The servicing or maintenance is carried out when an indicator or a plurality of indicators show that the monitored equipment or the monitored system will fail or that operating properties, technical properties, functions of the monitored equipment or of the monitored technical system are degrading.

For the purpose of description of the invention and the advantageous refinements thereof, the terms servicing and maintenance will be used synonymously. They form a generic term for any measure which is useful for maintaining or improving the functional readiness of the monitored technical system, for example exchanging components or wearing parts; cleaning contamination, replacing operating fluids, lubrication; replacing or cleaning filters; removing waste products; repairing areas of damage, etc.

Condition-based maintenance was introduced in order to attempt to service or maintain the correct equipment at the correct time. CBM is based on the use of real time data in order to prioritize and optimize maintenance resources. Monitoring the condition of the system is known as "condition monitoring". A device for monitoring the condition will detect the "health" or the "state of health" of the monitored equipment and act only if maintenance is actually necessary. Developments over the last years have led to technical systems and equipment being provided with extensive measuring technology, and this has given rise, together with improved tools for analyzing condition data, to a situation in which the maintenance personnel are nowadays more able than ever to take the decision as to when is the correct time for carrying out maintenance on pieces of equipment. The condition-based maintenance ideally permits the maintenance personnel to do only what is correct and necessary, which minimizes spare part costs and downtimes of the system during maintenance and the times required for maintenance.

There is some literature about condition-based maintenance which represents the current state of the art in this field and which explains the terms, measures and devices used in this context. This literature includes:

Jarrell D B, Sisk D R & Bond L J: "Prognostics and Condition-based Maintenance (CBM)—a Scientific Crystal Ball", publication by Pacific Northwest National Laboratory, Richland, Wash., No. PNL-SA-36771 from 2002 with further references;

Publication of the International Atomic Energy Agency IAEA "Implementation Strategies and Tools for Condition-Based Maintenance at Nuclear Power Plants, IAEA-TECDOC-1551, May 2007, with further references;

Memorandum for Secretaries of the Military Departments, by Deputy Under-Secretary of Defence, USA, 25 Nov. 2002: "Policy for Department of Defence condition-based maintenance".

From the publications above, distributed, inter alia, via the Internet, it is apparent that different condition sensors can be used for monitoring variables which can indicate the load or wear of a component of a technical system. For example, vibrations, expansion of materials, temperatures, viscosities or other properties of operating fluids, etc. can be monitored.

Examples from the patent literature on condition-based maintenance can be found in DE 103 32 629 A2, DE 101 44 076 A1, EP 08 95 197 B1, DE 31 10 774 A1, DE 10 2005 012 901 B4, DE 102 22 187 A1, DE 101 48 214 C2.

The respectively monitored technical systems can be entirely different; condition-based maintenance has advantages in many technical areas. Examples can be found in the abovementioned references and patent documents. Condition-based maintenance is also of interest, in particular, in the field of aircraft technology since such technology is particularly maintenance-intensive owing to the relevance of the technical systems used to safety.

There is, in particular, a need to use condition-based maintenance on all possible parts of an aircraft which require maintenance.

However, this is a distant objective which cannot yet be implemented owing to the shortcomings of the devices and methods known hitherto for monitoring conditions and performing maintenance.

With aircraft technology there is also the problem of an expected increase in maintenance works since new materials, such as force-flux-compatible composite fiber materials, are being increasingly used in the construction of aircraft in order to save weight. In particular in the case of fiber-reinforced composite materials it is, however, possible for wear phenomena and invisible internal damage to occur in the case of relatively heavy loading, with the result that an exchange of components made of fiber-reinforced composite materials is indicated after specific scopes of operation and degrees of loading before these components fail. It would therefore be desirable to be able to perform condition-based maintenance on as many of such components as possible.

However, the main disadvantage of CBM is that the initial costs of CBM are very high. CBM requires improved measuring technology for the monitored equipment. The costs of adequate measuring technology are usually very high; this also applies specifically to equipment which has already been installed. However, even when pieces of technical equipment and systems with the previously known condition sensors and evaluation technologies are re-developed, high additional costs are incurred, with the result that condition-based maintenance could previously be implemented only on a small number of main components of technical systems.

The invention is based on the object of obtaining assistance in taking a decision with respect to maintenance planning on the basis of signals of sensors which can supply definitive information about a state of health of the monitored system but nevertheless are simpler and more cost effective to manufacture and to integrate into the measuring technology than was previously the case with condition sensors used in CBM.

There is literature on condition monitoring (CBM) with perfect sensors. However, condition monitoring with perfect sensors can be applied to real systems only to a restricted degree. In order to permit condition-based maintenance (CBM) of a system, the system must be equipped with sensors which are capable of determining the state of health thereof as far as possible in real time (see in this respect DIN 44300). In classic CBM implementations, the sensors determine an expected remaining useful life (RUL) and, if appropriate, a reliability factor (confidence level). The calculation of the RUL is very complex depending on the application and increases the implementation costs.

It is known, for example from the abovementioned literature and patent literature, that high to prohibitive costs are incurred by the development of CBM sensors and, above all, the algorithms which calculate the remaining useful life from acquired physical data of the sensors. This is due to the fact that the sensor attempts to determine the most precise remaining useful life possible at any time between the equipment being put into service and its failure. The developer of the sensor does not know how well the calculation of the remaining useful life has to be effective at specific intervals, with the result that he does not have any possibility to optimize. Until now there has been no product or literature relating to the subject of assistance in making a decision with imperfect sensors.

SUMMARY

The invention wishes to supply assistance in differentiating on the basis of imperfect sensors.

According to one preferred refinement, the invention makes available an advantageous algorithm for arriving at a decision, with which algorithm the technical problem presented above can be solved.

Assistance in taking a decision for maintenance planning with imperfect sensors permits better prediction of the future wear behavior of condition-monitored components or systems. The improved prediction can be used for a better decision assistance algorithm.

According to one aspect, the invention provides a maintenance information device for supplying information for condition-based maintenance of a technical system, comprising:

a preferably ordinal sensor having a sensor element for monitoring at least one load variable or wear variable of the technical system as an indicator of a maintenance-relevant condition of the system, wherein the sensor is designed to supply a preferably ordinal condition signal, an operating-scope-detection device which detects a cumulated scope of the operation of the system as a value of an operating scope parameter, an expected-value-supplying device for supplying a degradation function which represents the expected degradation profile of the condition, which can be determined by means of the load variable or wear variable, as a function of the operating scope parameter, a remaining-service-life-determining device, which, a) when at least one predetermined degree of degradation of the condition occurs, compares the current value reached for the operating scope parameter with the value of the operating scope parameter which is expected for this predetermined degree of degradation according to the expected degradation profile, and/or b) when at least one predetermined value of the operating scope parameter occurs, compares the current degree of degradation of the condition detected by means of the sensor with the value of the operating scope parameter which is expected according to the expected degradation profile given this degree of degradation, and owing to the current value of the operating scope parameter in the case a) and of the degree of degradation in the case b) said remaining-service-life-determining device supplies a recalibrated expected degradation profile of the condition plotted against the operating scope parameter, and a maintenance-recommendation-generating device for generating a maintenance recommendation for a future planning time period on the basis of the recalibrated expected degradation profile.

According to a further aspect, the invention provides a hyperordinal condition signal for monitoring the condition of at least one component of a technical system for determining a recommendation as to whether or not maintenance is indicated within a specific planning time period.

According to a further aspect, the invention provides a hyperordinal condition sensor for monitoring a condition of at least one component of a technical system for determining a recommendation as to whether or not maintenance is indicated within a specific planning time period.

According to a further aspect, the invention provides a method for deciding whether maintenance of a technical system is to be carried out, having the steps:

a) monitoring the system with a sensor element and supplying a condition signal and the current value, present during the detection of the condition signal, of an operating scope parameter which specifies the scope of the operation of the system, b) determining an expected degradation profile for the condition which represents an expected degradation of the condition by means of the operating scope parameter from empirical values and/or simulation values for the system, c) determining a remaining-service-life-expectation distribution from the condition signal supplied by means of the sensor element, and from the expected degradation function, d) classification of the remaining service life expectation into one of a plurality of predefined classes, and e) generating a maintenance recommendation on the basis of the class obtained.

The invention preferably makes it possible to provide assistance in differentiating using data from imperfect hyperordinal sensors.

Hyperordinal sensors provide the possibility of reproducing the condition of the system with imprecision. A sensor is hyperordinal if it classifies the state of health of the system monitored by it. For example, the following classes can be used:

Green: nominal operating condition
Yellow: measurable wear, but no risk of a system failure
Red: shortly imminent system failure
Black: system failure While there are no perfect sensors in reality, classic sensors are more complex in design compared to the hyperordinal sensors proposed according to one preferred embodiment of the invention, and entail correspondingly higher development and operating costs. A hyperordinal sensor generates definitive information with significantly reduced entropy, but remains largely precise in the significant definitive information.

According to one aspect, the invention provides "assistance in taking decisions with data from imperfect hyperordinal sensors", which is an algorithm which permits reliable remaining useful lives to be determined from economic hyperordinal condition information.

Such an algorithm permits reliable determination of the remaining useful life on the basis of very imprecise definitive information which has been acquired about the state of health of a system.

Exemplary embodiments of the invention are explained in more detail below on the basis of the appended drawings, in which:

DETAILED DESCRIPTION OF EMBODIMENTS

Figure 1:
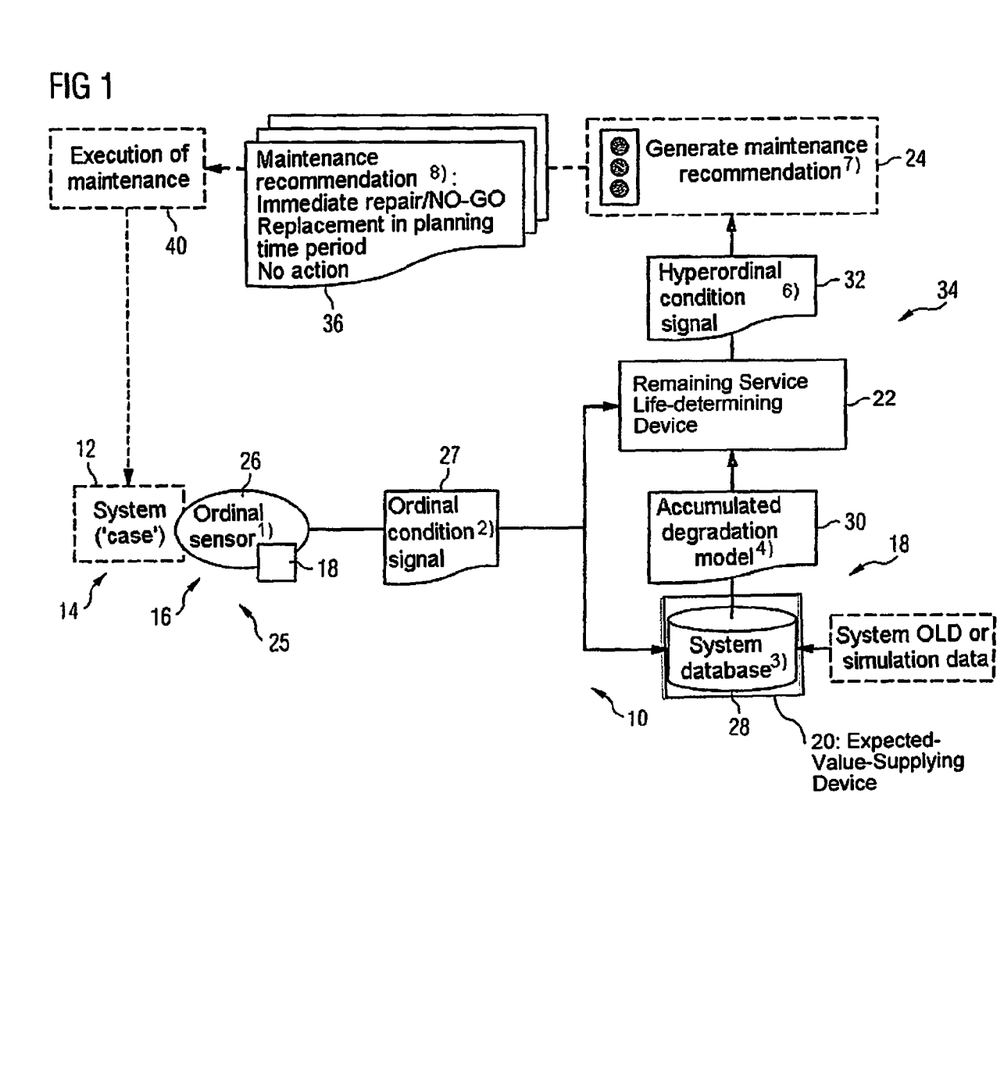
FIG. 1 shows a schematic block illustration of a maintenance information device and of a method, which can be carried out therewith, for arriving at a decision for or against performing maintenance on a monitored technical system.

FIG. 1 is a schematic illustration of a maintenance information device 10 and of a flowchart for the functioning thereof in the form of an algorithm which is illustrated as a block diagram. The maintenance information device 10 serves to supply information for arriving at a decision as to whether or not maintenance should be performed on a condition-monitored technical system 12.

The technical system 12 can be any equipment or component which has to be maintained. Examples of such technical systems can be found in the literature and patent literature on condition-based maintenance which is mentioned at the beginning. In one preferred exemplary embodiment, the monitored technical system 12 is a component 14 or a piece of equipment of an aircraft. Examples of such components are structural elements of the rear or of wings or of tailplane fins, propulsion units or propulsion unit components, air conditioning systems, cooling systems, life support systems, rescue equipment, chassis and parts of chassis etc.

The maintenance information device 10 has a sensor 16, an operating-scope-detection device 18, an expected-value-supplying device 20, a remaining-service-life-determining device 22 and a maintenance-recommendation-generating device 24.

The sensor 16 is a state-of-health-detecting device 25 which detects a state of health of the technical system 12.

In the example illustrated, the sensor 16 is designed to detect a variable or an operating parameter of the technical system 12 which can be used as an indicator of the condition of the system in which servicing or maintenance would be necessary.

In the example illustrated, the sensor 16 is an imperfect sensor which carries out ordinal condition measurement as an ordinal sensor. The conditions are preferably scaled on an ordinal scale, with the result that a degree of degradation of the condition can be determined. The degree of degradation can extend, for example, from the "AS NEW" condition (for example as new normal condition/fully unloaded, unworn condition) up to the "SYSTEM FAILURE" condition.

The sensor 16 has for this purpose a sensor element 26 which is designed to monitor and detect at least one load variable or wear variable of the technical system which can be a measure of loading or of wear on at least one part of the system 12 and therefore an indicator of a state of health. For example, static or dynamic loads, expansion, vibrations, temperatures, viscosities or other properties of operating fluids etc. are measured.

Some examples of load variables or wear variables which are to be monitored can be found in the literature and patent literature on CBM which is mentioned at the beginning. Examples of sensor elements 26 which can also be used for monitoring conditions in the maintenance information device 10 described here are described and shown in the following documents, and the content thereof is incorporated herewith through reference: WO2009/062635A1, WO2009/087164A1, WO2009/071602A2, DE10004384C2, DE10053309A1, DE10153151A1, DE10236051A1, DE102006060138A1, DE102008017175A1, as well as DE102010032093.5-22, which was not published before the priority date of the present document. With respect to other details on the design of possible sensor elements 26, reference is made expressly to the specified documents.

The operating-scope-detection device 18 detects the cumulated scope of the operation of the monitored technical system 12 and supplies the dimension as a value of an operating scope parameter. In most cases, the service life of the monitored system 12 is simply detected as an operating scope parameter. In the case of vehicles and the like, the total distance traveled with the vehicle or one of the components thereof (for example engine block) could also be specified as an operating parameter since the distance traveled in the case of such vehicles can have a greater influence on wear and loading than the actual service life. In the case of technical systems where degradation could occur independently of the actual operation, for example owing to material fatigue owing to aging phenomena or due to environmental influences such as the wind, weather, sea water, either the time could be simply accumulated or else the time for which the component to be monitored is subjected to environmental influences could be accumulated. All these are examples of possible operating scope parameters; and depending on the application a suitable operating-parameter-detection device 18 is provided such as, for example, a clock or some other timing device for measuring the operating period or for measuring other time periods which are relevant for the state of health, or an odometer such as, for example, a milometer, etc.

In the text which follows, the maintenance information device 10 is, for the sake of simpler illustration, explained using the example in which the service life of the monitored technical system 12 is detected for the operating scope parameter.

In the illustrated example, the operating-scope-detection device 18 is simply part of the sensor 16. In this example, the sensor 16 also has, in addition to the sensor element 26 for detecting the load variable or operating variable, the operating-scope-detection device 18 for detecting the cumulated value of the operating scope parameter, specifically here the accumulated service life.

On the basis of the detection of the at least one load variable or wear variable and of the value of the operating scope parameter which is present at the time of the detection, the sensor 16 forms an ordinal condition signal 27, which is explained in more detail below with reference to FIGS. 2 and 3.

Figure 2:
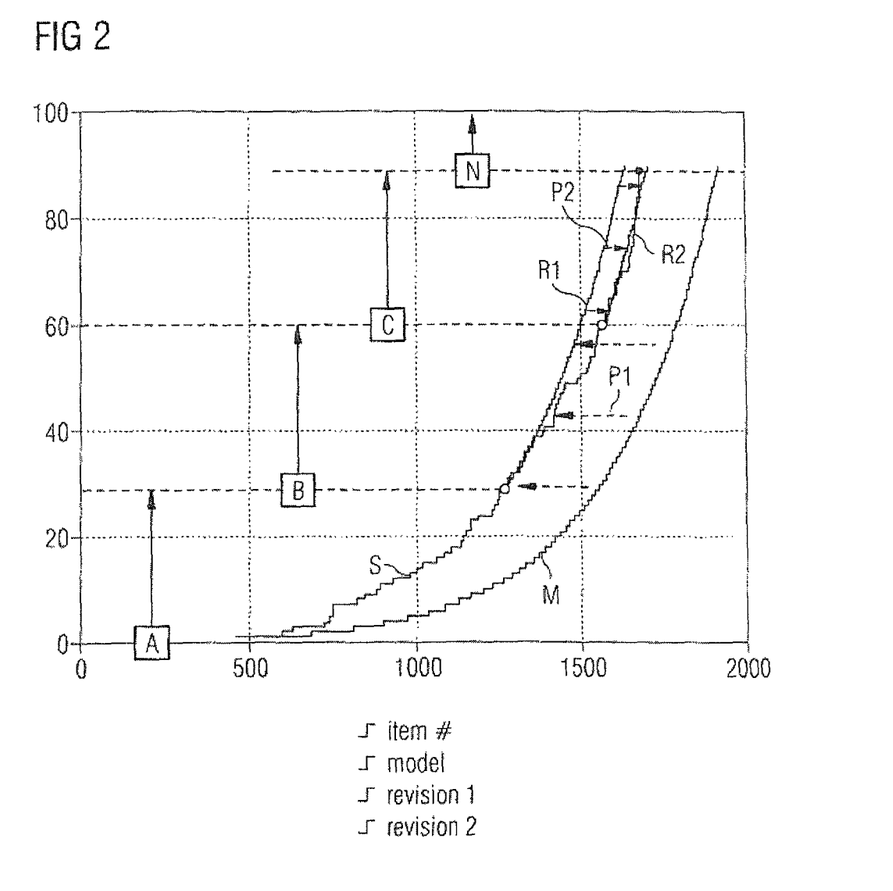
FIG. 2 shows a graph with an example of calculation of a degradation model on the basis of a first exemplary case.
Figure 3:
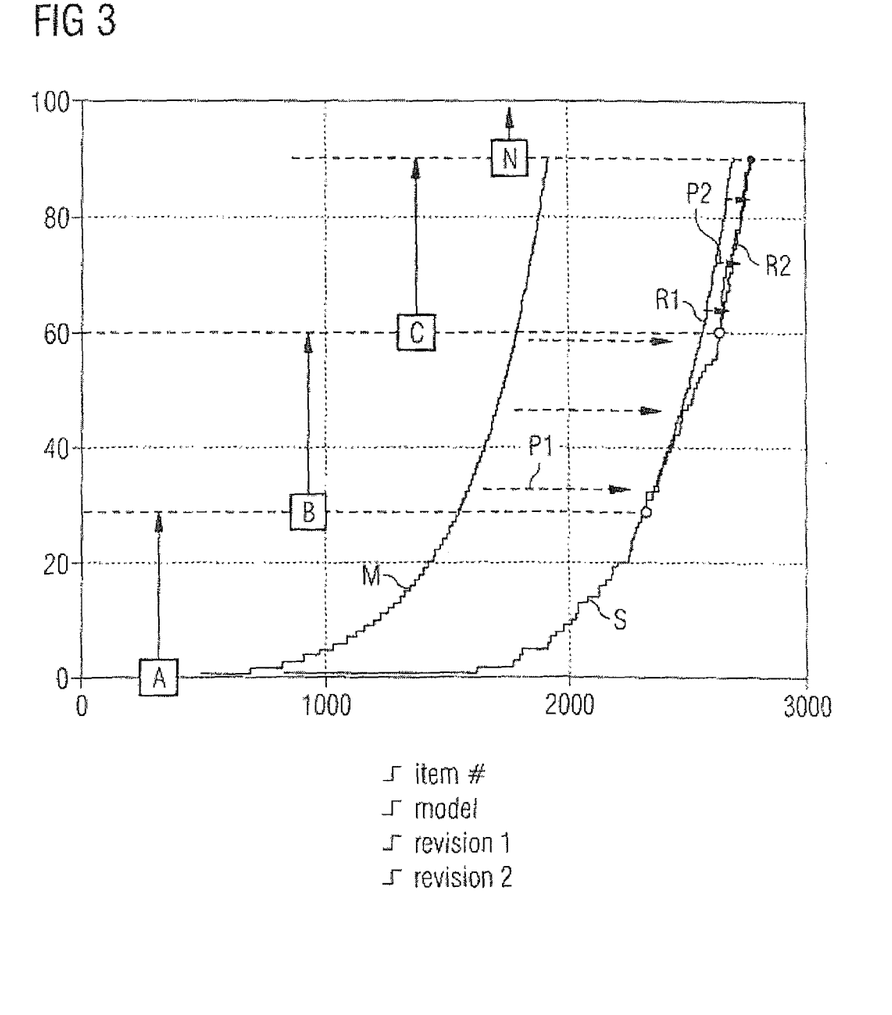
FIG. 3 shows a graph which is comparable to that in FIG. 2 with an example for the calculation of a degradation model on the basis of a further exemplary case.

As is illustrated in FIGS. 2 and 3 on the basis of exemplary curves S for the ordinal condition signal 27, in the example illustrated here the sensor 16 supplies, as an ordinal condition signal S, a degree of degradation j, determined on the basis of the detected value of the load variable or wear variable, as a function of the operating scope parameter—here the service life s-hrs in service hours. With the procedure described here it is sufficient that the actual degree of degradation j which is detected by the sensor 16 is indicated only relatively or ordinally. For example, the degree of degradation in the graphs in FIGS. 2 and 3 is illustrated in a standardized fashion, wherein 100 characterizes the system failure as 100% degradation, and 0 characterizes the as new condition as 0% degradation. According to FIG. 1, to which reference is now made again, the expected-value-supplying device 20 has a system database 28 which contains degradation paths accumulated on the basis of experience with relatively old systems, which are comparable to the technical system 12, and/or on the basis of simulation data. In particular, the database contains empirical values and/or simulation values which contain expected conditions per value of the operating scope parameter. For example, the system database contains expected values for condition/service hours or condition/operating cycles. For example expected functional values for the load parameter or wear parameter are specified as a function of the operating scope parameter as a specific example. Furthermore, the system database 28 obtains newer values by obtaining the condition signal 27 from the sensor 16, which can be additionally used for the later determination of expected values.

The expected-value-supplying device 20 is designed to calculate an accumulated degradation model 30 of the technical system 12 from the data of the system database 28. Such an accumulated degradation model 30 can be represented as an expected degradation profile of the condition which is monitored by the sensor 16. Examples of such accumulated degradation models can be found in the respective curve M in the graphs in FIGS. 2 and 3 for two specific exemplary cases (case A in FIG. 2, and case B for FIG. 3) of system monitoring.

As is apparent from FIG. 1, to which reference is now made again, the remaining-service-life-determining device 22 is connected to the ordinal sensor 16 in order to obtain the ordinal condition signal 27, and is connected to the expected-value-supplying device 20 in order to obtain accumulated degradation models 30. The remaining-service-life-determining device 22 calculates a remaining service life distribution from accumulated degradation models 30 of the system database 28 and from the measured ordinal condition signal 27 of the technical system 12. A hyperordinal condition signal 32, which indicates a hyperordinal system condition, is then generated from the calculated remaining service life distribution.

A hyperordinal condition sensor 34 is therefore formed. In the example illustrated here, said condition sensor 34 has the ordinal sensor 16, the expected-value-supplying device 20 and the remaining-service-life-determining device 22. Sensors which classify states of health of the systems monitored by them are referred to as hyperordinal here. For example, the following classes are used:

GREEN: nominal operating condition
YELLOW: measurable wear, but no risk of a system failure
RED: shortly imminent system failure
BLACK: system failure Examples of the classification, the calculation of the remaining service life distribution and a prediction of the remaining service life therefrom are explained further below in more detail on the basis of the exemplary cases A and B which are represented in FIGS. 2 and 3, with the result that the nature of the hyperordinal condition sensor 34 becomes more comprehensible.

As illustrated in FIG. 1, the maintenance-recommendation-generating device 24 determines, from the hyperordinal condition signal 32, a maintenance recommendation 36 according to one of the classifications above. As a result, a decision assistance function for maintenance measures on the system 12 is obtained. In particular it is interesting here whether maintenance is necessary on the planning scale.

Aircraft are used, for example, in short-range operation, mid-range operation or long-range operation. For example, it is interesting to know whether maintenance would be necessary within a planned short distance, medium distance or long distance, and said maintenance work would accordingly have to be carried out in advance. It is possible that maintenance is not yet necessary for a short distance, but that the occurrence of a necessity to perform maintenance would be expected within the time period of a long distance. The maintenance would therefore be carried out before the long distance, but not yet before the short distance. It is also possible that maintenance should be planned at the destination, remote from the home airport, and corresponding material should be carried along.

The maintenance recommendations 36 could therefore be one of the following, depending on the planning horizon considered:

Immediate repair
NO-GO
Planning of replacements in the planning time period (for example carrying along replacement part so that it is possibly replaced at the destination before a return flight);
No action (all in the GREEN region).

In the embodiment of the device 10 presented here and the method which can be carried out with it there is no provision other than the outputting of such classified maintenance recommendations.

The maintenance personnel will then follow the maintenance recommendation and plan and execute the maintenance 40.

The classification and estimation of the remaining service life are explained in more detail below on the basis of two exemplary cases A and B which are represented in FIGS. 2 and 3. These figures represent graphs in which the degree of degradation j of the monitored condition is illustrated plotted against the operating scope parameter, in our example the service hours [s-hrs].

As already explained above, the curves S represent the measured ordinal condition signals in the form of a function of the degree of degradation as a function of the value of the operating scope parameter, at which this degree of degradation has been measured. The curves M1 and M2 represent, in the two cases, the accumulated degradation models 30, supplied by the expected-value-supplying device 20, as functions of the expected degradation values j in accordance with the values of the operating scope parameter where these degradation values j are expected.

A classification is provided on the basis of the degradation values j. In the illustrated examples it is defined that sensor signals which indicate degradation values j between 0 and 30 are assigned to a class A. If sensor signals are within this class A, the state of health is in the green region and no action or maintenance is necessary.

Sensor signals which indicate a measurable wear but where there is still no risk of a system failure are assigned to class B. In the exemplary cases specified in FIGS. 2 and 3, said class B extends from the degree of degradation j=30 up to the degree of degradation j=60.

A further class C, which indicates that a system failure is shortly imminent, extends, in the specified examples, from the degree of degradation j=60 up to the degree of degradation j=90.

Sensor signals which indicate a degree of degradation of j>90 are assigned to the class N for NO-GO in the example. Further operation without previous maintenance is to be prohibited when this class occurs.

In particular it is interesting here to estimate the number of service hours s-hrs up to the point where the NO-GO class N is reached. In the case of the aircraft it would be important, for example, to know: can I still fly without risk for a short distance, a medium distance or a long distance?

Let us look at the example in case A, which is represented in FIG. 2. The accumulated degradation model 30 indicates at the beginning, according to the curve M, a value of approximately 1900 s-hrs service hours up to the point where the NO-GO class is reached.

A sensor signal transition from class A to class B is to be assumed at or approximately at the degree of degradation j=30. The number of service hours s-hrs which have expired until this second class B is reached is, however, only approximately 1300 s-hrs, while according to the degradation model 30 approximately 1600 s-hrs have been estimated until the class B is reached. This gives occasion for a drastic revision 1 of the initially estimated degradation model 30. The revision 1 is indicated as a leftward displacement P1 of the remaining degradation path of the degradation model 30. A degradation model which is revised for the first time according to revision 1 is produced, as is indicated by the curve R1.

A second revision 2 occurs at the degree of degradation j=60 if the condition for class C is met. Here, the number of service hours reached for j=60 by the measured condition signal 27 is somewhat larger than the number of service hours estimated by the revised expected degradation function—curve R1. A (slight) rightward displacement P2 of the remaining degradation model path indicates a (moderate) prolongation of the usable remaining service life of the monitored element. The remaining degradation model path which is correspondingly revised again is represented as revision 2 by the curve R2.

Let us now consider the case B as represented in FIG. 3. It is assumed here that a transition from class A to class B at the degree of degradation j=30 is not achieved until after approximately 2400 s-hrs service hours in the case of the measured condition signal 27, as indicated by curve S. According to the degradation path M in accordance with the initial accumulated degradation model 30, such a transition should have already been expected at approximately 1600 service hours. This gives occasion for a drastic revision 1 of the initially estimated degradation model 30 for the estimation of the service hours remaining until the NO-GO class N is reached. This is indicated by a rightward displacement P1, which leads to the remaining revised degradation model path according to revision 1, indicated as curve R1. A further revision 2 occurs if the condition for class C has been reached. A condition signal and degradation model which have been measured again are also made compatible with the accumulated number of service hours here. A slight rightward displacement P2 of the remaining degradation model path shows a further (moderate) prolongation of the usable service life of the monitored unit. This is illustrated in the graph in FIG. 3 by the remaining curve R2 for the revision 2.

The examples clarify that it is sufficient if recalibration of the expected degradation profile of the condition occurs only at certain specific values of the condition signal.

It is also sufficient if the condition signal is allocated to classes and the class is indicated. As long as the class A is present, the hyperordinal condition sensor 34 can indicate the signal GREEN as a hyperordinal condition signal for the remaining useful life.

For example, a changeover from a class A into a class B does not take place until a specific threshold for the state of health has been reached, for example when a load variable or wear variable monitored by the sensor element 26 reaches a specific threshold value. The value of the operating scope parameter which is reached then is used to recalibrate the expected degradation profile. As a result, the distribution of the remaining service life can be estimated again, and a corresponding maintenance recommendation class (for example still GREEN or already YELLOW) can therefore be generated as a function of the planning time period which is of interest.

It is therefore sufficient to use imperfect ordinal sensors for condition monitoring and to equip them with a simple evaluation logic which outputs simple classified signals (only A, B, C or N or GREEN, YELLOW, RED or BLACK) for the conditions and the recommendations.

It is particularly interesting that simple recalibration of the estimation of the remaining service life can take place on the basis of simple classified condition signals, which are only arranged ordinally, on the basis of the information as to which operating scope a class transition occurs in.

Deviations from the illustrated exemplary embodiment are self-evident. For example, it would be conceivable, instead of recalibrating the model to estimate the remaining service life, not when a specific transition for the load variable or wear variable is reached, but instead to use the fact that a specific value of the operating parameter is reached. The model 30 in FIG. 2 or 3 is revised again in the case of a different embodiment (not illustrated), not when a specific degree of degradation j is used but instead when a specific number of service hours is reached, for example every 500 service hours, on the basis of the condition signal which is then present. However, since the condition signal supplies a better basis for reliable information about imminent maintenance, the variant illustrated in FIGS. 2 and 3 is preferred.

The invention claimed is:

1. A maintenance information device for supplying information for condition-based maintenance of a technical system, comprising:
   an ordinal sensor having a sensor element configured to monitor at least one load variable or wear variable of the technical system as an indicator of a maintenance-relevant condition of the system, the sensor being further configured to supply an ordinal condition signal;
   an operating-scope-detection device configured to detect a cumulated scope of the operation of the system as a value of an operating scope parameter;
   an expected-value-supplying device configured to supply a degradation function which represents the expected degradation profile of the condition, which can be determined by the load variable or wear variable, as a function of the operating scope parameter;

a remaining-service-life-determining device which is configured to perform at least one of a) and b) as follows:

a) when at least one predetermined degree of degradation of the condition occurs, compare the current value reached for the operating scope parameter with the value of the operating scope parameter which is expected for this predetermined degree of degradation according to the expected degradation profile and due to the current value of the operating scope parameter, supply a recalibrated expected degradation profile of the condition plotted against the operating scope parameter; and b) when at least one predetermined value of the operating scope parameter occurs, compare the current degree of degradation of the condition detected by the sensor with the value of the operating scope parameter which is expected according to the expected degradation profile given this degree of degradation and, due to the current degree of degradation, supply a recalibrated expected degradation profile of the condition plotted against the operating scope parameter; and a maintenance-recommendation-generating device configured to generate a maintenance recommendation for a future planning time period on the basis of the recalibrated expected degradation profile.

2. The maintenance information device as claimed in claim 1, wherein
the maintenance-recommendation-generating device is configured to classify a current state of health of the system to be monitored into a plurality of classes.

3. The maintenance information device as claimed in claim 2, wherein
the maintenance-recommendation-generating device is configured to classify a state of health into at least two classes which are selected from a group of classes which contains at least one of the following:
a nominal operating condition,
measurable wear, but no risk of failure of the monitored system,
shortly imminent system failure, and
system failure.

4. The maintenance information device as claimed in claim 3, wherein
the remaining-service-life-determining device is configured to carry out recalibration of the expected degradation profile in the case of a transition between two classes.

5. The maintenance information device as claimed in claim 3, wherein
the expected-value-supplying device is configured to produce an expected degradation curve as a model for the degradation, from a database with at least one of empirical for the system and simulation values for the system.

6. The maintenance information device as claimed in claim 2, wherein
the remaining-service-life-determining device is configured to carry out recalibration of the expected degradation profile in the case of a transition between two classes.

7. The maintenance information device as claimed in claim 6, wherein
the expected-value-supplying device is configured to produce an expected degradation curve as a model for the degradation, from a database with at least one of empirical values for the system and simulation values for the system.

8. The maintenance information device as claimed in claim 2, wherein
the expected-value-supplying device is configured to produce an expected degradation curve as a model for the degradation, from a database with at least one of empirical for the system and simulation values for the system.

9. The maintenance information device as claimed in claim 2, wherein
the remaining-service-life-determining device is configured to determine a remaining service life distribution from accumulated degradation models, which are determined from a system database, and from the measured ordinal condition signal of the system.

10. The maintenance information device as claimed in claim 1, wherein
the expected-value-supplying device is configured to produce an expected degradation curve as a model for the degradation, from a database with at least one of empirical values for the system and simulation values for the system.

11. The maintenance information device as claimed in claim 10, wherein
the degradation profile, currently detected by the sensor, of at least one of the load variable and the wear variable, is included in the database as further empirical values by the operating scope parameter.

12. The maintenance information device as claimed in claim 1, wherein
the remaining-service-life-determining device is configured to determine a remaining service life distribution from accumulated degradation models, which are determined from a system database, and from the measured ordinal condition signal of the system.

13. The maintenance information device as claimed in claim 12, wherein
the remaining-service-life-determining device is configured to supply a hyperordinal system condition signal.

14. A method for deciding whether maintenance of a technical system is to be carried out, the method comprising:
monitoring the system using a sensor element and supplying a condition signal and a current value, present during the detection of the condition signal, of an operating scope parameter which specifies the scope of the operation of the system;
determining an expected degradation profile for the condition which represents an expected degradation of the condition by the operating scope parameter from at least one of empirical values for the system and simulation values for the system;
determining a remaining-service-life-expectation distribution from the condition signal supplied the sensor element and from the expected degradation function;
classifying the remaining service life expectation into one of a plurality of predefined classes; and
generating a maintenance recommendation on the basis of the class obtained.

15. The method as claimed in claim 14, wherein the monitoring of the system includes at least one of the following operations:
using an imperfect ordinal sensor to detect at least one of a load variable and a wear variable which specifies information about a state of health of the monitored system;

detecting at least one current value of the operating scope parameter at the time of measurement of a predetermined value of the at least one of the load variable and the wear variable; and detecting a current value of at least one of the load variable and the wear variable when a predetermined value of the operating scope parameter occurs.

16. The method as claimed in claim 14, wherein the determining of a remaining-service-life-expectation distribution includes at least one of the following:

when at least one predetermined degree of degradation of the condition monitored by the sensor is detected, comparing the current value of the operating scope parameter reached during this detection with the value expected for this predetermined degree of degradation according to the expected degradation profile, and recalibrating the expected degradation profile by the operating scope parameter on the basis of the value of the operating scope parameter;

when at least one predetermined value of the operating scope parameter is reached, detecting the current degree of degradation then present by the sensor and comparing the current degree of degradation with the value of the operating scope parameter expected in the case of this degree of degradation according to the expected degradation profile, recalibrating the expected degradation profile based on the degree of degradation detected, and determining the remaining service life distribution on the basis of the expected degradation profile that was recalibrated.

17. The method as claimed in claim 16, wherein
the monitoring of the system includes classifying the measured condition signal into one of a plurality of classes and indication of the corresponding class; and
the comparing of the current value of the operating scope parameter is carried out at the transition from one class to another class.

18. The method as claimed in claim 17, wherein the classifying includes classifying the measured condition signal into one of at least two classes which are selected from a group of classes which contains at least one of the following:

a nominal operating condition,
measurable wear, but no risk of failure of the monitored system,
shortly imminent system failure, and
system failure.

19. The method as claimed in claim 14, wherein the classifying of the remaining service life includes classifying the remaining service life distribution, determined when determining a remaining-service-life-expectation distribution, into one of at least two classes which are selected from a group of classes which contains at least one of the following:

a nominal operating condition,
measurable wear, but no risk of failure of the monitored system,
shortly imminent system failure, and
system failure.

20. The method as claimed in claim 14, wherein the determining an expected degradation profile includes at least one of the following operations:

interrogating a system database with empirical values or simulation values as to which degrees of degradation for the condition are to be expected at which values of the operating scope parameter; and producing an accumulated degradation model for the system from empirical values or simulation values.

* * * * *